(12) United States Patent
Kawabe et al.

(10) Patent No.: US 7,320,477 B2
(45) Date of Patent: Jan. 22, 2008

(54) AIR BAG SYSTEM

(75) Inventors: Hiroshi Kawabe, Aichi (JP); Tadashi Yamamoto, Aichi (JP); Mishiyasu Ito, Aichi (JP); Takanobu Ikeda, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 211 days.

(21) Appl. No.: 11/246,276

(22) Filed: Oct. 11, 2005

(65) Prior Publication Data

US 2006/0091647 A1  May 4, 2006

(30) Foreign Application Priority Data

Oct. 21, 2004 (JP) .............................. 2004-307149

(51) Int. Cl.
*B60R 21/20* (2006.01)
(52) U.S. Cl. ................. 280/730.2; 280/728.2
(58) Field of Classification Search ............. 280/728.2, 280/730.2
See application file for complete search history.

(56) References Cited

U.S. PATENT DOCUMENTS

| 5,518,266 | A | 5/1996 | O'Docherty | |
| 6,279,941 | B1 * | 8/2001 | Nakajima et al. | 280/728.2 |
| 2003/0042712 | A1 * | 3/2003 | Henderson et al. | 280/728.2 |
| 2003/0222435 | A1 * | 12/2003 | Schmidt et al. | 280/728.2 |
| 2005/0029778 | A1 * | 2/2005 | Weber et al. | 280/728.2 |

FOREIGN PATENT DOCUMENTS

| JP | 2000-247203 | 9/2000 |
| JP | A-2000-247203 | 9/2000 |

* cited by examiner

*Primary Examiner*—Ruth Ilan
(74) *Attorney, Agent, or Firm*—Posz Law Group, PLC (57) ABSTRACT

An air bag system of the invention is attached using an attaching piece portion and includes an air bag which is inflated for deployment when an inflating gas flows thereinto. The air bag is attached to an inner panel by attaching an attaching bracket having a pair of strengthening plates provided on front and back sides of the attaching piece portion with a bolt as a fastening means. A through hole in the attaching piece portion is set to such a size that a location constituting a circumferential edge is disposed at a position deflected from an area between a head portion of the bolt and the inner panel when a fastening stem portion of the bolt is fastened to the inner panel. The bolt is fastened to the inner panel in such a state that only the attaching bracket is interposed between the inner panel and the head portion.

8 Claims, 10 Drawing Sheets

AIR BAG SYSTEM

This application is based on Japanese Patent Application No. 2004-307149, which is incorporated herein by reference.

BACKGROUND OF THE INVENTION

1. Field of the Invention

The present invention relates to an air bag system that is folded and placed in a recess portion of a vehicle in such a manner as to be inflated to project from the recess portion for deployment when an inflating gas flows therein.

2. Description of the Related Art

As a related-art head protecting air bag system, there has existed an air bag system in which an attaching bracket is attached to a recess portion with a bolt which attaching bracket is attached to an attaching piece portion, which projects from a folded air bag main body and which has an attaching hole for attachment to the recess portion, by providing a pair of strengthening plates of sheet metal on front and back sides of the attaching piece portion and crimping the strengthening plates at predetermined locations thereon, respectively, in such a manner as to produce irregularities (for example, refer to JP-A-2000-247203). In the head protecting air bag system, the attaching piece portion is constructed to be attached to the recess portion together with the attaching bracket by passing the bolt through a through hole formed in the attaching piece portion and attaching holes formed in the respective strengthening plates so as to be fastened to a circumferential edge of an attaching hole formed in a body side inner panel of sheet metal which constitutes the recess portion.

In the related-art head protecting air bag system, however, when the bolt is fastened to the circumferential edge of the attaching hole in the inner panel, not only the strengthening plates that make up the attaching bracket but also a location which makes up a circumferential edge of the through hole in the attaching piece portion of the air bag are interposed between a head portion of the bolt and the inner panel. Due to this, when the bolt is fastened in a nut provided on the inner panel, there is caused a form in which the attaching piece portion interposed between the bolt head portion and the inner panel is gradually compressed, and this makes it difficult to have a bottoming feeling, and hence there has still remained a room for improvement with respect to facilitating the torque management at the time of fastening the bolt.

SUMMARY OF THE INVENTION

The invention was made with a view to solving the problem and an object thereof is to provide an air bag system which can provide a good tightening force management of fastening means such as bolts which are used in attaching the air bag to the vehicle.

With a view to solving the problem, according to the invention, there is provided an air bag system comprising an air bag folded and placed in a recess portion of a vehicle, comprising an attaching piece portion having an attaching hole for attachment to the recess portion, and an attaching bracket comprises a pair of strengthening plates attachable to front and back sides of the attaching piece portion by crimping the strengthening plates at predetermined locations thereon, respectively, in such a manner as to produce irregularities, wherein the air bag is constructed to be attached to the recess portion with fastening means which comprises a fastening stem portion and a head portion and passes through an attaching hole provided in the attaching bracket and a through hole in the attaching piece portion with the attaching bracket being placed at the recess portion, wherein the through hole in the attaching piece portion is set to such a size that a location thereof which makes up a circumferential edge of the through hole is deflected from an area between the head portion and an inner panel which makes up the recess portion when the fastening stem portion is fastened to the inner panel, and wherein the fastening means allows the fastening stem portion to be fastened to a circumferential edge of the attaching hole in the inner panel in such a state that only the attaching bracket is interposed between the inner panel and the head portion. Incidentally, the attaching bracket can be made of sheet metal. Further, the fastening stem portion is passed through the attaching hole and the through hole in the attaching piece portion so as to be fastened to the circumferential edge of an attaching hole formed in a body side of the inner panel which makes up the recess portion, and the head portion which presses the circumferential edge of the attaching hole in the attaching bracket against the inner panel side to thereby fix the attaching bracket to the inner panel when the fastening stem portion is fastened to the inner panel.

In the air bag system of the invention, when the fastening stem portion of the fastening means is fastened to the circumferential edge of the attaching hole in the inner panel, the location which constitutes the circumferential edge of the through hole in the attaching piece portion of the air bag is not interposed between the head portion and the inner panel. Accordingly, in a case where a bolt is used as the fastening means, when the air bag system is installed in the recess portion, the bolt easily bottoms during fastening to complete the fastening work, whereby a torque that is needed when the fastening of the bolt is completed can be made substantially constant, this facilitating the torque management at the time of fastening the bolt.

Consequently, according to the air bag system of the invention, the tightening force management of the fastening means such as bolts that are used in attaching the air bag system to the vehicle can be improved.

Note that rivets, metallic clips and the like can be raised as the fastening means in addition to bolts. Even in the event of utilizing such fastening means, when the fastening means is fastened to the inner panel, the tightening force at the time of completion of fastening can be made constant since the location which constitutes the circumferential edge of the through hole in the attaching piece portion is not interposed between the fastening means and the inner panel. According thereto, the management of tightening force can be facilitated.

In addition, in the air bag system, a configuration may be adopted in which the attaching bracket is provided in such a manner that at least one of the strengthening plates is interposed between the head portion and the inner panel.

Furthermore, in the air bag system, a configuration may be adopted in which the attaching bracket is provided in such a manner that both the strengthening plates are interposed between the head portion and the inner panel.

Moreover in the air bag system, a configuration may be adopted in which the attaching piece portion is configured so as to include a projecting portion which prevents the dislodgement of the attaching piece portion from the attaching bracket at a distal end side thereof which is far away from the air bag main body and is exposed from the attaching bracket. Thus, this configuration is preferred since the attaching piece portion is prevented from being dislodged from between the strengthening plates which constitute the attaching bracket.

DETAILED DESCRIPTION OF THE PREFERRED EMBODIMENTS

Figure 1:
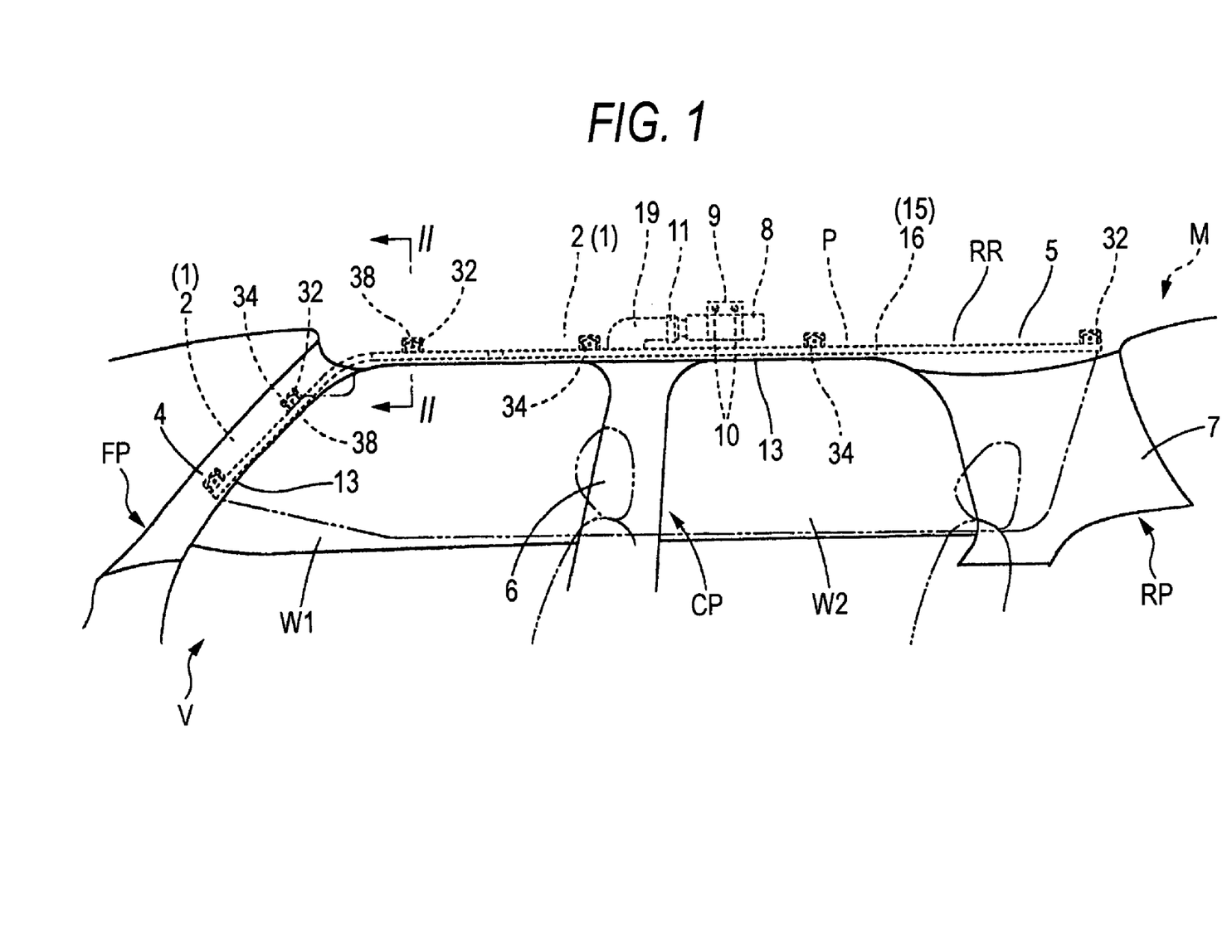
FIG. 1 is a schematic front view of a head protecting air bag system which constitutes an embodiment of the invention that is seen from a passenger compartment's side.

Hereinafter, embodiments of the invention will be described by reference to the drawings. In this embodiment, a head protecting air bag system M as shown in FIG. 1 will be taken for description as an air bag system to which the invention can be applied. The head protecting air bag system M is such as to be installed on a vehicle V shown in FIG. 1 and is placed in a recess portion P that is formed in a front pillar portion FP and a roof side rail portion RR at upper edge sides of doors, windows W1, W2 and a rear pillar portion RP on a passenger compartment side of the vehicle. Note that this vehicle V is configured so as to include a center pillar portion CP which extends substantially vertically between the front pillar portion FP and the rear pillar portion RR.

As shown in FIG. 1, the head protecting air bag system M is configured so as to include an inflator 8, attaching brackets 9, 34, attaching bolts 10, 38 and an air bag 15, and when it is installed on the vehicle V, the head protecting air bag system M is stowed in the recess portion P with a passenger compartment side thereof covered by an air bag cover 13. In the case of this embodiment, the air bag cover 13 is made up of a lower edge side location of a front pillar garnish 4 which covers a passenger compartment side of the front pillar portion FP and a lower edge side location of a roof lining 5 which covers a passenger compartment side of the roof side rail portion RR.

The front pillar garnish 4 and the roof lining 5 are made from synthetic resin and are attached to a passenger compartment side of an inner panel 2 which is a body 1 side member at the front pillar portion FP and the roof side rail portion RR. Then, these lower edge side locations are constructed so as to be opened towards the interior of a passenger compartment so that the air bag 15 is enabled to project thereinto when it is inflated for deployment.

The inflator 8 is made into substantially a cylindrical shape and has provided at a distal end (front end) side thereof a gas discharge port, not shown, which is capable of discharging an inflating gas therefrom. Then, the inflator 8 is joined to the air bag 15 in such a manner that the vicinity of the distal end including the vicinity of the gas discharge port is inserted into a gas inlet port portion 19 of the air bag 15 and the portion of the inflator 8 so inserted into the gas inlet port portion 19 is clamped to be fixed thereto by making use of a clamp 11 that is fitted on the gas inlet port portion 19 at a rear end thereof. In addition, the inflator 8 is also attached to the inner panel 2 by making use of an attaching bracket 9 which holds the inflator 8 and an attaching bracket 10 which fixes the attaching bracket 9 to the body 1 side inner panel 2. Note that the installation of the inflator 8 on to the vehicle V is implemented as an air bag assembly in which the inflator 8 is assembled to the air bag 15.

The air bag 15 is stowed in a folded state in the recess portion P that is formed from the front pillar portion FP, which is provided in such a manner as to extend obliquely upwards, to a location of the roof side rail portion PP which extends from the front pillar portion FP over above the center pillar portion CP to apposition situated above the rear pillar portion RP. When completely inflated, the air bag 15 is configured so as to cover the passenger compartment sides of the windows W1, W2, the center pillar portion CP and the rear pillar portion RP, respectively, as shown by a chain double-dashed line in FIG. 1.

The air bag 15 is configured so as to include a air bag main body 16 which is folded to be recessed in the recess portion P and a plurality of attaching piece portions 32 that project from the folded air bag main body 16 so as to attach the air bag 15 to the body 1 side of the vehicle V in the recess portion P, and in the case of this embodiment, the air bag main body 16 and the attaching piece portions 32 are made integral by one-piece woven using polyester threads and polyamide threads.

Figure 8:
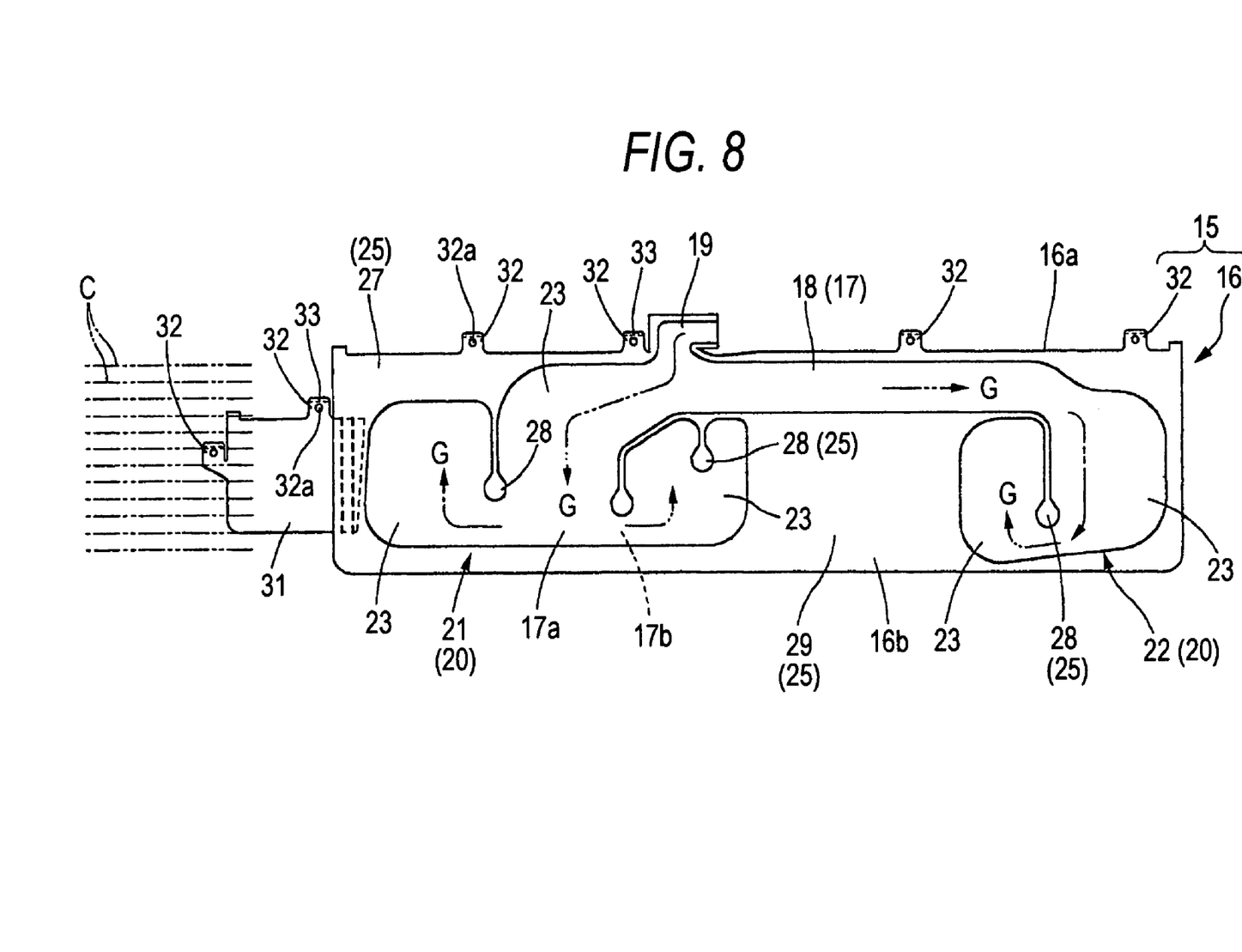
FIG. 8 is a front view showing a state in which the air bag is deployed flat which is used in the head protecting air bag system of the embodiment.

As shown in FIG. 8, the air bag main body 16 is made up of a gas-flowing portion 17 where an inflating gas G is allowed to flow into the interior thereof by separating an internal wall portion 17a and an external wall portion 17b from each other and a non-gas-flowing portion 25 where the inflating gas G is not allowed to flow thereinto.

In the case of this embodiment, the gas-flowing portion 17 is made up of a gas supply path portion 18, the gas inlet portion 19 and a protecting inflatable portion 20. The gas supply path portion 18 is provided on an upper edge 16a side of the air bag main body 16 in such a manner as to extend along a longitudinal direction of the vehicle V. In addition, the gas supply path portion 18 is configured so as to guide the inflating gas G that is discharged from the inflator 8 into the protecting inflatable portion 20 that is provided below the gas supply path portion 18, and the gas inlet port portion 19, which is connected to the inflator 8, is provided in such a manner as to project upwards from the air bag main body 16 while being made to communicate with the gas supply path portion 18. In the case of this embodiment, the gas supply path portion 18 is configured so as to be opened at a rear end side thereof.

The protecting inflatable portion 20 is a location that is disposed in such a manner as to cover the passenger compartment sides of the windows W1, W2 for protection of the heads of occupants when the air bag 15 is inflated and deployed. The protecting inflatable portion 20 is configured to include a front side protecting portion 21 that is provided in such a manner as to cover the passenger compartment side of the window W1 at a side of a front seat and a rear side protecting portion 22 that is provided in such a manner as to cover the passenger compartment side of the window W2 at a side of a rear seat when the air bag 15 is inflated and deployed, and the front side and rear side protecting portions 21, 22 are each divided by joined partitioning portions 28, which will be described later on, so as to have in their areas, respectively, a plurality of vertically inflatable portions 23 that are arranged in parallel with each other in the longitudinal direction, each of the plurality of vertically inflatable portions being configured to inflate along a vertical direction in their areas.

The non-gas-flowing portion 25 is configured as a location where the internal wall portion 17a and the external wall portion 17b are joined to each other, and in the case of this embodiment, the non-gas-flowing portion 25 is made up of a joined circumferential edge portion 27, joined partitioning portions 28 and a plate-like portion 29. The joined circumferential edge portion 27 is provided at an outer circumferential edge location of the air bag main body 16 in such a manner as to surround the gas-flowing portion 17. In addition, a connecting fabric 31 which constitutes a front end side of the air bag main body 16 is connected to a front end of the joined circumferential portion.

The plate-like portion 29 is formed into a rectangular plate-like shape and is disposed below the gas supply path portion 18 between the front side protecting portion 21 and the rear side protecting portion 22. The joined partitioning portions 28 are provided in such a manner as to extend from upper edge sides of the joined circumferential edge portion 27 and the plate-like portion into the front side and rear side protecting portions 21, 22, respectively. These joined partitioning portions 28 are provided so as to divide the front side and rear side protecting portions 21, 22 into the plurality of vertically inflatable portions 23 to thereby restrict the thickness of the air bag 15 when the same air bag has completed its inflation.

The attaching piece portions 32 are provided in a plural number (six in this embodiment) in such a manner as to project upwards from upper edge side locations of the joined circumferential edge portion 27 on the upper edge side 16a of the air bag main body 16 and an upper edge side of the connecting fabric 31. An attaching bracket 34 is to be attached to each attaching piece portion 32 for attaching the air bag 15 to the body 1 side of the vehicle V (refer to FIGS. 1 to 7). A through hole 32a is formed in each attaching piece portion 32 so that an attaching bolt 38, which functions as a fastening means, is allowed to pass therethrough. This through hole 32a is made to be opened in substantially a square shape and is set to such a size that when the attaching bracket 34 is attached to front and back sides of the attaching piece portion 32 and a fastening stem portion 38b of the attaching bolt 38 is fastened to a nut 2b provided on the inner panel 2, a location 32b which constitutes a circumferential edge of the through hole is provided at a position which is deflected from an area between a head portion 38a of the attaching bolt 38 and the inner panel 2. To be specific, the through hole 32a is set to a size which permits the passage of the head portion 38a of the attaching bolt 38.

In addition, a stitched portion 33, which functions as a projecting portion formed using a sewing thread, is formed on an upper edge side of each attaching piece portion 32 in such a manner as to extend along substantially the full length thereof in the longitudinal direction. This stitched portion 33 is formed in such a manner as to, as shown in FIGS. 2 and 4 to 6, project inwards and outwards from a surface of the attaching piece portion 32 at a location exposed from the attaching bracket 34 when the attaching bracket 34 is attached and is such as to be provided to prevent the dislodgement of the attaching piece portion 32 from the attaching bracket 34 (between external and internal plate portions 35, 36).

Figure 7:
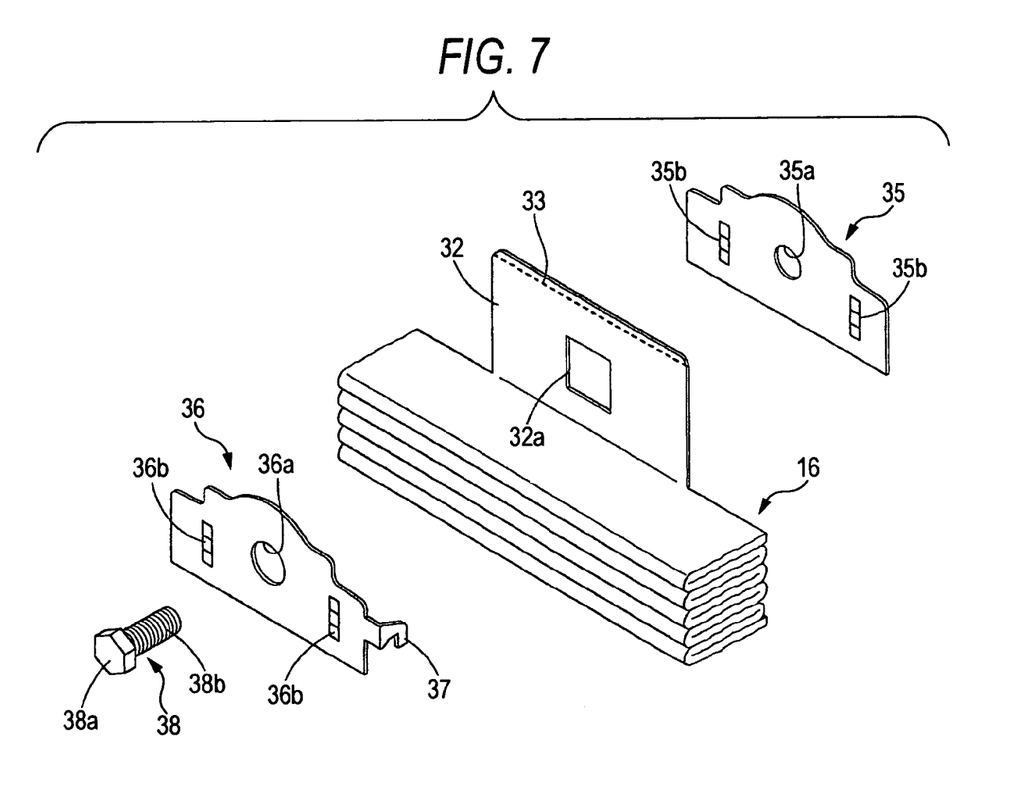
FIG. 7 is an exploded perspective view showing an attaching bracket and a location of an attaching piece portion on an air bag in the heat protecting air bag system of the embodiment.

The attaching bracket 34, which fixes the attaching piece portion 32 to the body 1 side of the vehicle V, is made of sheet metal, and, in the case of this embodiment, is configured so as to be made up of a pair of external and internal plate portions 35, 36 which are formed into substantially a rectangular plate-like shape which is substantially the same as an external shape of the attaching piece portion 32. The external plate portion 35 is such as to be provided in such a manner as to cover an outside O of the attaching piece portion 32 and is provided, in such a manner as to correspond to the through hole 32a, with an attaching hole 35a which permits the passage of the fastening stem portion 38b of the attaching bolt 38 therethrough. In addition, deformation expecting portions 35b, 35b, which are to form crimped portions 34a, are provided on both left and right sides (front and rear sides when installed on the vehicle) of the attaching hole 35a.

Figure 3:
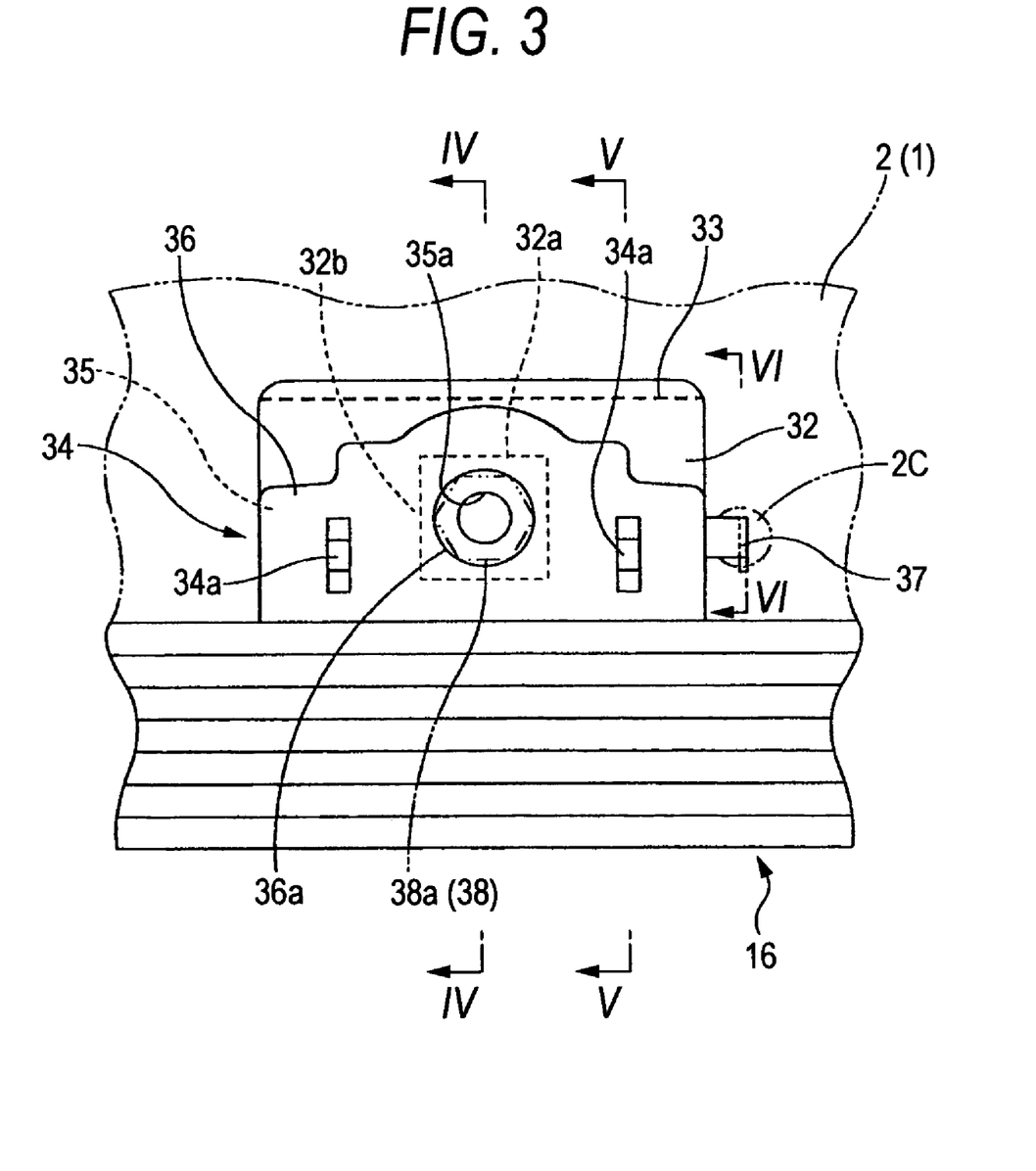
FIG. 3 is an enlarged front view of an air bag assembly of the head protecting air bag system of the embodiment.
Figure 4:
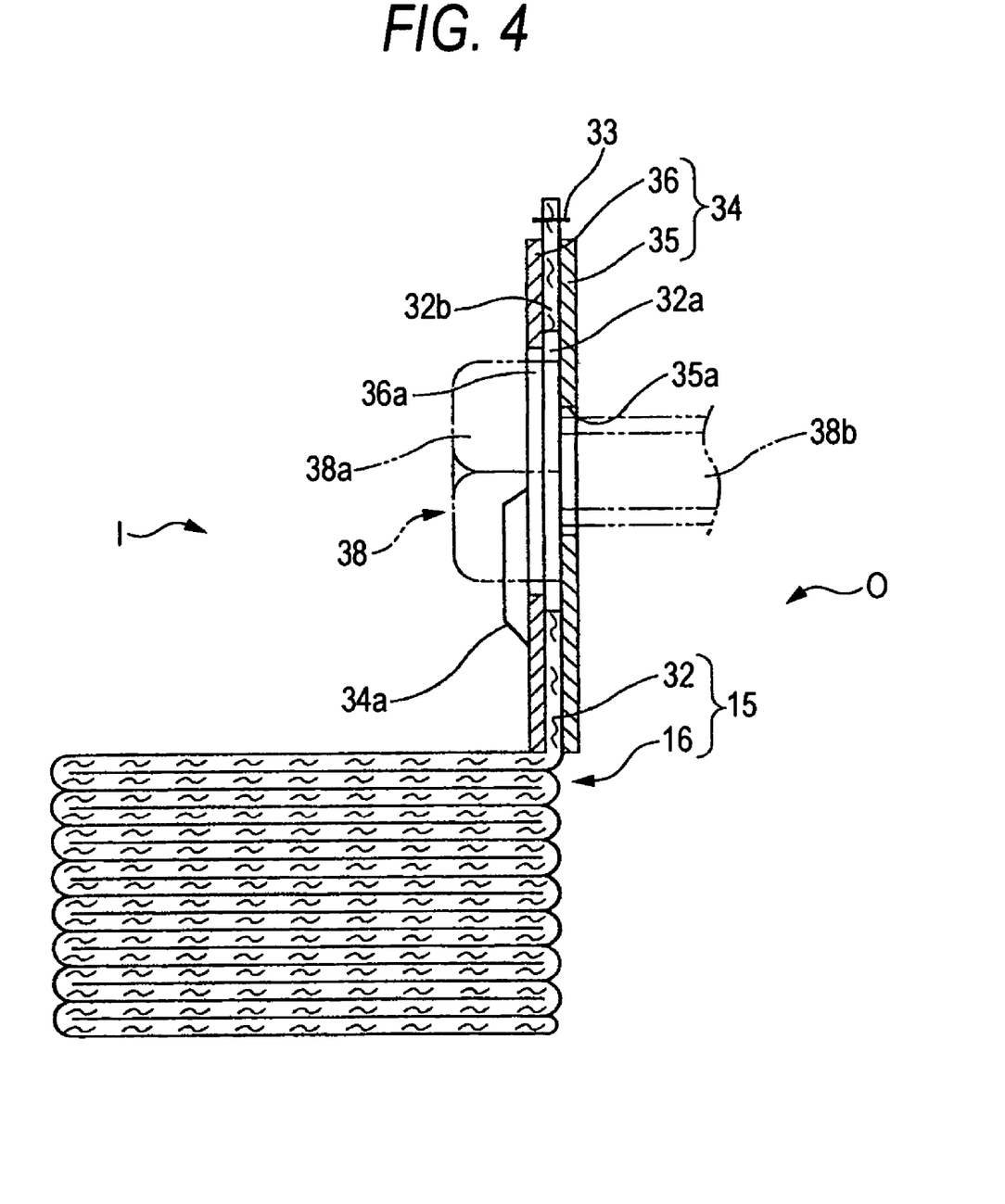
FIG. 4 is a schematic sectional view taken at a location indicated by the line IV-IV in FIG. 3.
Figure 6:
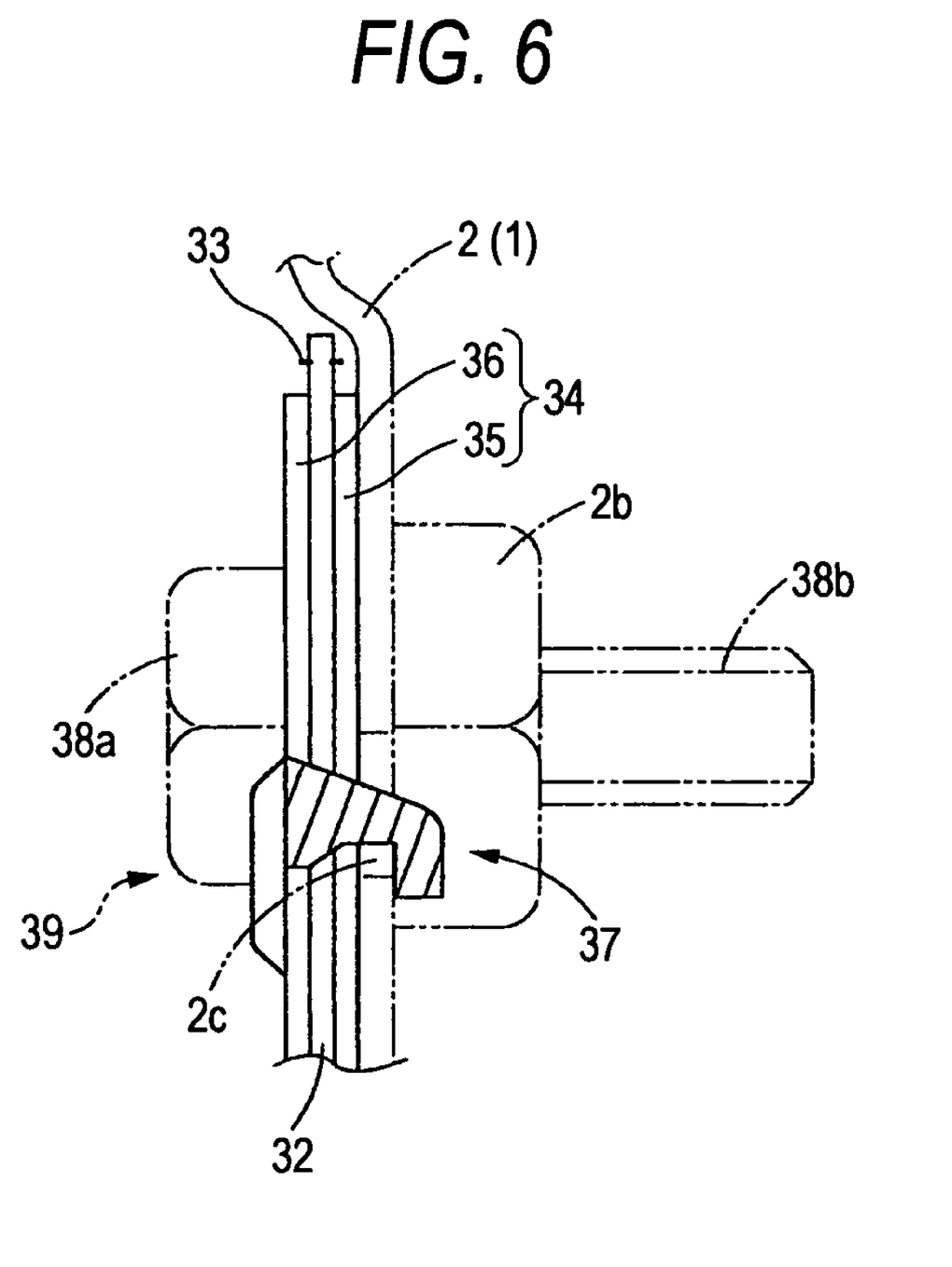
FIG. 6 is a schematic sectional view taken at a location indicated by the line VI-VI in FIG. 3.

The internal plate portion 36 is such as to be provided in such a manner as to cover an inside I of the attaching piece portion 32 and is provided, in such a manner as to correspond to the through hole 32a, with an attaching hole 36a which permits the passage of the head portion 38a of the attaching bolt 38 therethrough. In addition, deformation expecting portions 36b, 36b, which are to form crimped portions 34a, are provided on both left and right sides (front and rear sides when installed on the vehicle) of the attaching hole 36a. In addition, a locking claw 37 which projects to the outside o of the attaching piece portion 32 is formed on a lateral edge portion side (in the case of this embodiment, a right edge side) of the internal plate portion 36. As shown in FIGS. 3 and 6, this locking claw 37 is such as to be brought into engagement with a circumferential edge of a locking hole 2c formed in the inner panel 2 and is formed so as to align the attaching holes 35a, 36a and the through hole 32a with the attaching hole 2a in the inner panel 2 when the locking claw 37 is locked in the locking hole 2c in such a state that the attaching bracket 34 is attached to the attaching piece portion 32.

Figure 5:
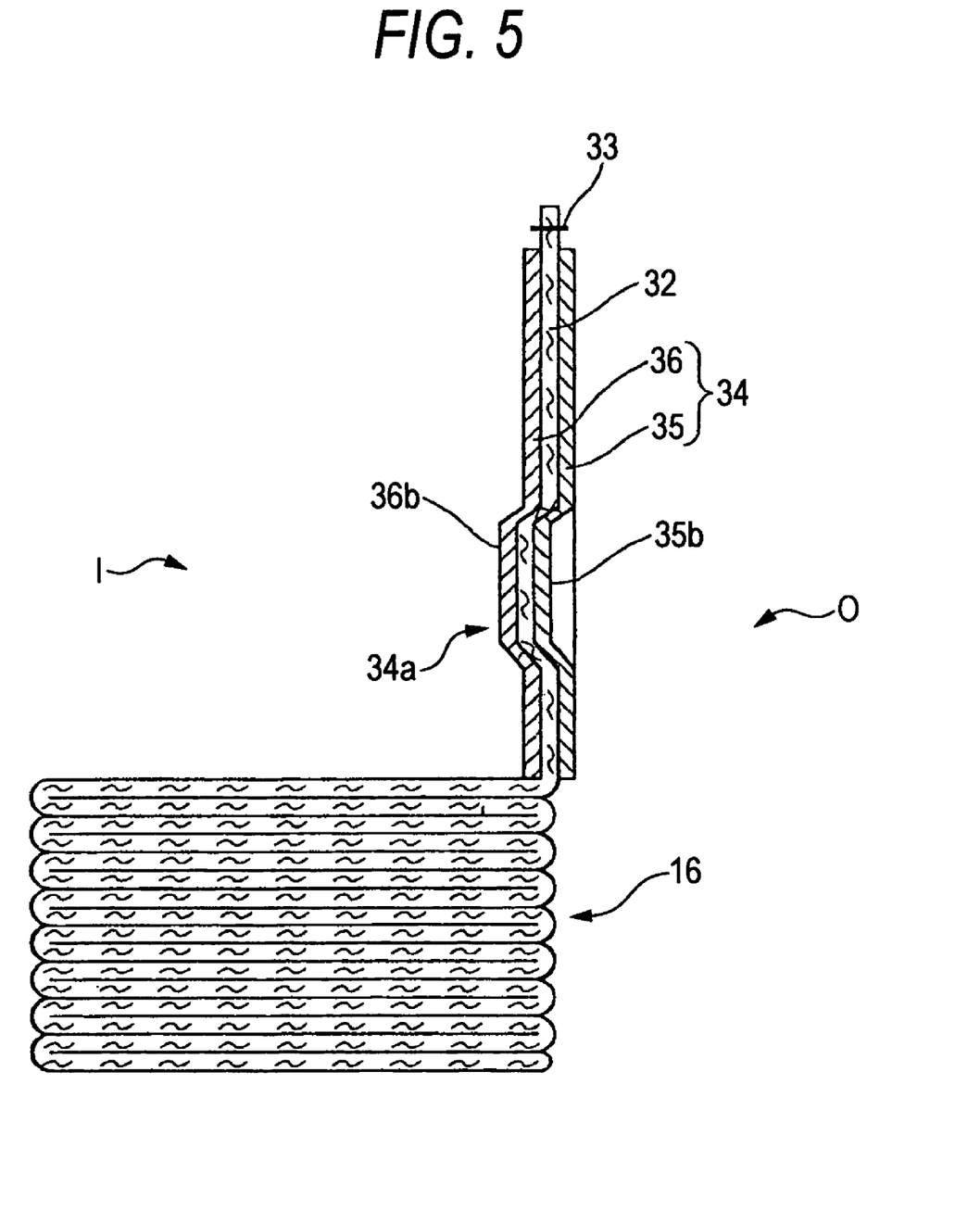
FIG. 5 is a schematic sectional view taken at a location indicated by the line V-V in FIG. 3.

Then, the external and internal plate portions 35, 36 are provided on the front and back sides of the attaching piece 32, respectively, and crimped portions 34a are, as shown in FIG. 5, formed at the deformation expecting portions 35b, 36a in such a manner as to project towards the inside I of the attaching piece portion 32, whereby the attaching bracket 34 is attached to the attaching piece portion 32.

The attaching bolt 38, which functions as the fastening means for attaching the attaching bracket 34 to the instrument panel 2, is configured so as to include the fastening stem portion 38b that is passed through the attaching holes 35a, 36a and the through hole 32a to thereby be fastened to the nut 2b that is formed around a circumferential edge of the attaching hole 2a in the inner panel 2 and the head portion 38a which presses circumferential edges of the attaching holes 35a, 36b against the inner panel 2 side so as to fix the circumferential edges of the attaching holes 35a, 36a to the inner panel 2 side when the fastening stem portion 38b is fastened to the inner panel 2.

Figure 2:
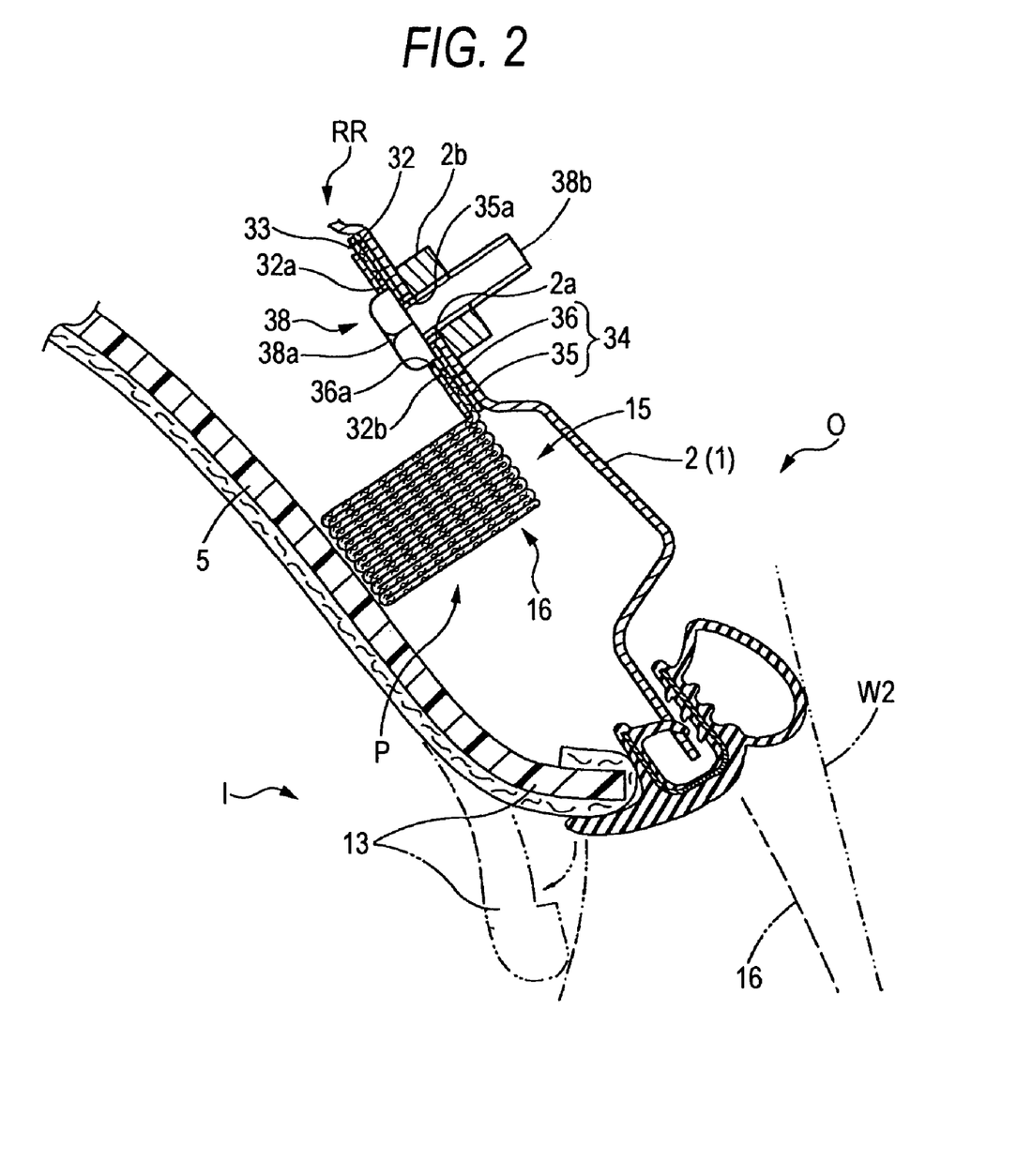
FIG. 2 is a schematic sectional view taken at a location indicated by the line II-II in FIG. 1.

In the case of the embodiment, the attaching hole 36a that is formed in the internal plate portion 36 of the attaching bracket 34 is configured so as to permit the passage of the head portion 38a of the attaching bolt 38 therethrough. Due to this, as shown in FIG. 2, the attaching bracket 34 is fixed to the inner panel 2 side while a peripheral location of the attaching hole 35a in the external plate portion 35 is pressed against the inner panel 2 side by the head portion of the attaching bolt 38 in such a state that the attaching piece portion 32 to which the attaching bracket 34 is attached is attached to the inner panel 2 by means of the attaching bolt 38, whereby only the external plate portion 35 on the attaching bracket 34 is interposed between the head portion 38a and the inner panel 2.

Next, the installation of the air bag system M of the embodiment will be described. Firstly, the air bag 15 is folded up. To be specific, the air bag main body 16 which is deployed flat is, as shown by chain double-dashed lines in FIG. 8, folded sequentially in a corrugated fashion to form folds C which are shaped into alternate ridges and grooves which extend in the longitudinal direction in such a manner as to make a lower edge 16b side of the air bag main body 16 approach the upper edge 16a side thereof.

Then, the air bag main body 16 is wrapped by a wrapping member, not shown, at a predetermined location thereof so as to prevent the collapse of the folded state of the air bag main body 16, and the attaching bracket 34 is attached to each attaching piece portion 32. In addition, the inflator 8 is connected to the gas inlet port portion 19 by utilizing the clamp 11, and following this, the attaching bracket 9 is attached to the perimeter of the inflator 8, the inflator 8 being assembled to the air bag 15, so that an air bag assembly is formed in advance.

Thereafter, with the locking claw 37 locked on the circumferential edge of the locking hole 2c, the respective brackets 9, 34 are disposed at the recess portion P on the body 1 side of the vehicle V so as to be bolted to the inner panel with the bolts 10, 38, so that the air bag assembly is attached to the body 1. Next, a lead wire, not shown, which extends from a predetermined inflator operation controller is connected to the inflator 8, and the front pillar garnish 4 and the roof lining 5 are attached and fixed to the body 1. Furthermore, a rear pillar garnish 7 and a center pillar garnish 6 are attached to the body 1. Thus, the air bag system M can be installed on the vehicle V.

Then, after the installation of the air bag system M to the vehicle V, in the event that the inflator 8 is activated, the inflating gas G from the inflator 8 flows into the gas supply path portion 18 from the gas inlet port portion 19 as shown by chain double-dashed lines in FIG. 8. Furthermore, the inflating gas G flows into the protecting inflatable portion 20 from the gas supply path portion 18, whereby the protecting inflatable portion 20 starts to inflate while unfolding the folds. Then, the air bag main body 16 breaks the wrapping member, not shown, then pushes on the air bag cover 13 that is made up of the lower edges of the front pillar garnish 4 and the roof lining 5 to open the same and projects downwards from the recess portion P, so that the air bag main body 16 is distended so large to cover the passenger compartment sides of the windows W1, W2, the center pillar portion CP and the rear pillar portion RP as indicated by the chain double-dashed line in FIG. 1.

Then, in the air bag system M of the embodiment of the invention, when the fastening stem portion 38b of the attaching bolt 38, which functions as the fastening means, is fastened to the nut 2b provided around the circumferential edge of the attaching hole 2a in the inner panel 2, only the external plate portion 35 is interposed between the head portion 38a and the inner panel 2. Namely, the location 32b on the attaching bracket 34 which constitutes the circumferential edge of the through hole 32a in the attaching piece portion 32 of the air bag 15 is not interposed between the head portion 38a and the inner panel 2. Accordingly, when installing the air bag system M in the recess portion P, since the bolt 38 easily bottoms while being fastened to thereby complete the fastening work, the torque that is required when the bolt 38 is completely fastened can be made substantially constant, this facilitating the torque management when the bolt 38 is fastened.

Consequently, according to the air bag system M of the embodiment, the management of tightening force of the fastening means such as the bolts 38 which are used when the air bag 15 is attached to the vehicle is improved.

Note that while, in this embodiment, the bolt 38 is used as the fastening means for fastening the attaching piece portion 32 to the body 1 side inner panel 2, the fastening means is not limited to the bolts but rivets and metallic clips may be used instead. Then, even in a case where rivets and metallic clips are used as the fastening means, when they are fastened to the inner panel, the location that constitutes the circumferential edge of the through hole in the attaching piece portion is not interposed between the rivet or metallic clip and the inner panel, the fastening force at the completion of fastening can be made constant, thereby facilitating the management of fastening force.

In addition, since the air bag system M of the embodiment is constructed such that the stitched portion 33, which functions as the projecting portion for preventing the dislodgement of the attaching piece portion 32 from the attaching bracket 34, is provided at the location which constitutes the distal end side (the upper edge side) of the attaching piece portion 32 which is far from the air bag main body 16 and which is exposed from the attaching bracket 34, it is possible to prevent the dislodgement of the attaching piece portion 32 from between the external and internal plate portions 35, 36 which constitute the attaching bracket 34. Note that while, in the case of the embodiment, the stitched portion 33 which uses the sewing thread is provided as the projecting portion, the projection means is not limited to the stitched portion 33, and for example, a projecting portion may be formed by applying an adhesive or the like on the surface of the attaching piece portion 32, and furthermore, in the case of the air bag made by hollow or tubular weaving, a projecting portion may be formed by increasing the thickness of a base fabric itself which constitutes the attaching piece portion 32.

Figure 9:
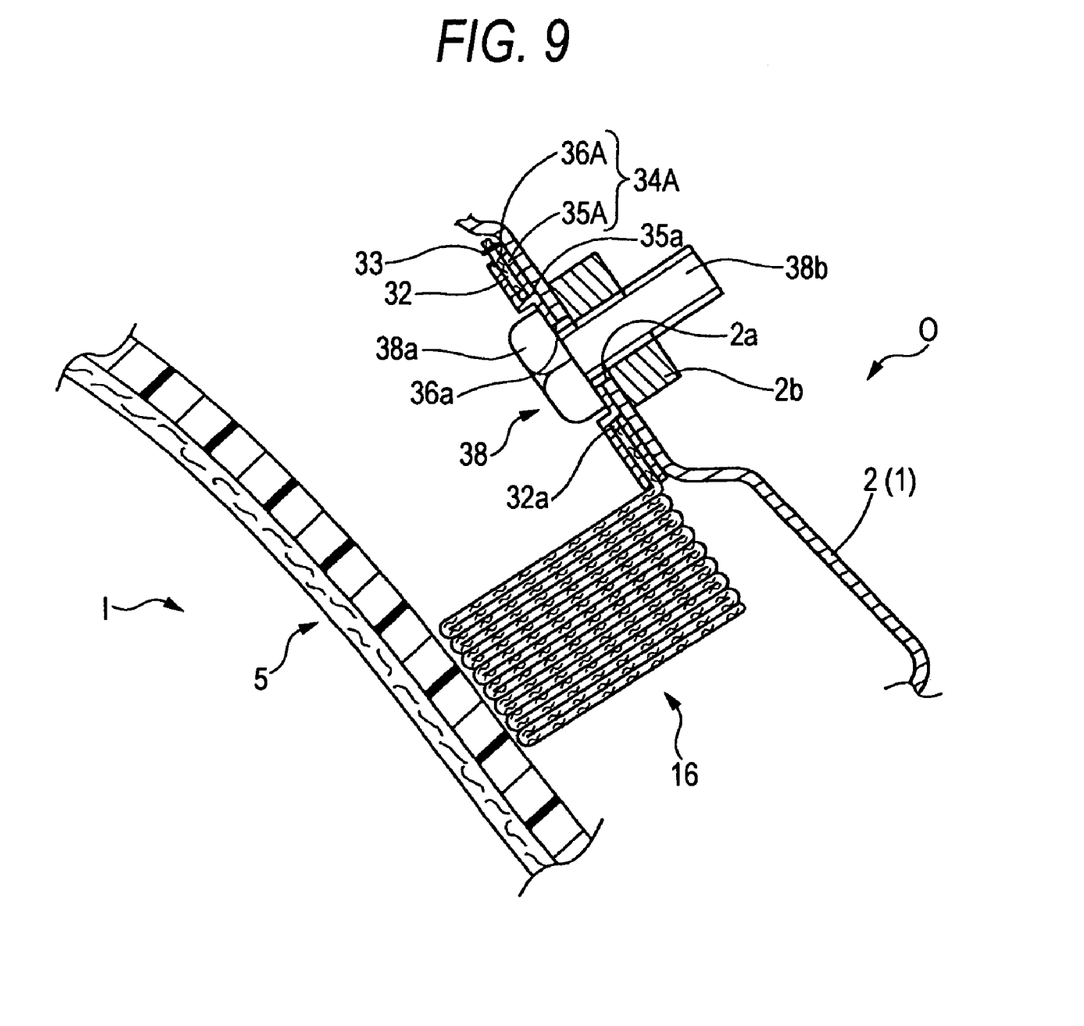
FIG. 9 is a schematic sectional view showing a head protecting air bag system of another embodiment.

Furthermore, while the air bag system M of the embodiment is configured such that the fastening stem portion 38b of the attaching bolt 38 is fastened to the nut 2b on the inner panel 2 while the head portion 38a is kept in abutment with the circumferential edge of the attaching hole 35a formed in the external plate portion 35 with both the external plate portion 35 and the internal plate portion 36 which constitute the attaching bracket 34 formed into the flat plate-like shapes, for example, as shown in FIG. 9, an attaching bracket 34A may be used which is configured such that a location on a circumferential edge of an attaching hole 36a in an internal plate portion 36A is made to pass through the through hole 32a of the attaching piece portion 32 and an attaching hole 35a of an external plate portion 35A so as to project to the outside o of the attaching piece portion 32 so as to be substantially flush with an external surface of the external plate portion 35A. In the attaching bracket 34A that is configured as just has been describe, the location on the circumferential edge of the attaching hole 36a in the internal plate portion 36A is pressed against the inner panel 2 side so as to be fixed thereto by the head portion 38a of the attaching bolt 38, whereby only the internal plate portion 36A on the attaching bracket 34A is interposed between the head portion 38a and the inner panel 2. Thus, as in the case with the aforesaid air bag system M, the torque required at the completion of fastening can be made substantially constant, thereby facilitating the torque management when the bolt 38 is fastened.

Figure 10:
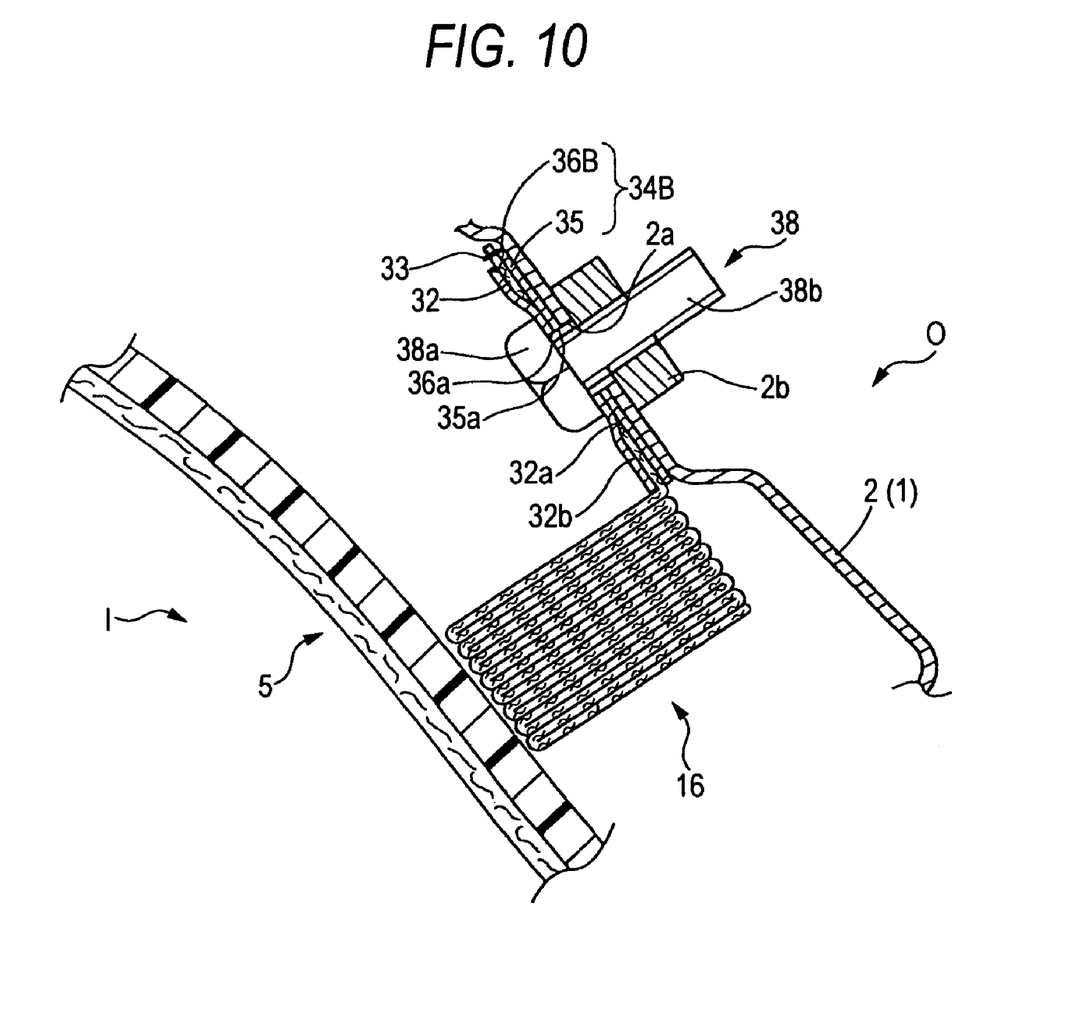
FIG. 10 is a schematic sectional view showing a head protecting air bag system of a further embodiment.

In addition, an attaching bracket 34B shown in FIG. 10 may be used as the attaching bracket in which an internal plate portion 36B has an attaching hole 36a whose inside diameter is set substantially identical to the inside diameter of the attaching hole 35a in the external plate portion 35. When the attaching bracket 34B that is configured as has been described just above is used, in the attaching bolt 38, the fastening stem portion 38b can be fastened to the nut 2b on the inner panel 2 while the head portion 38a is kept in abutment with a circumferential edge of the attaching hole 36a in the internal plate portion 36B. Even in this case, since only the internal plate portion 36B and the external plate portion 35 are interposed between the head portion 38a and the inner panel 2, the torque required at the completion of fastening the bolt 38 can be made substantially constant, thereby making it possible to facilitate the torque management when the bolt 38 is fastened.

Note that while, in the embodiments, the head protecting air bag system is taken as the example for description, the air bag system to which the invention can be applied is not limited thereto, and hence the invention may be applied to, for example, a side air bag system.

What is claimed is:

1. An air bag system comprising:
   an air bag folded and placed in a recess portion of a vehicle, comprising an attaching piece portion having a through hole for attachment to the recess portion; and
   an attaching bracket, which comprises a pair of strengthening plates attachable to front and back sides of the attaching piece portion by crimping the strengthening plates at predetermined locations thereon, respectively, in such a manner as to produce irregularities,
   wherein the air bag is constructed to be attached to the recess portion with fastening means which comprises a fastening stem portion, and a head portion and passes through an attaching hole provided in the attaching bracket and the through hole in the attaching piece portion with the attaching bracket being placed at the recess portion,
   wherein the through hole in the attaching piece portion is set to such a size that a location thereof which makes up a circumferential edge of the through hole is spaced from an area between the head portion and an inner panel which makes up the recess portion when the fastening stem portion is fastened to the inner panel, and
   wherein the fastening means allows the fastening stem portion to be fastened to a circumferential edge of an attaching hole in the inner panel in such a state that only the attaching bracket is interposed between the inner panel and the head portion.

2. The air bag system according to claim 1, wherein the attaching bracket is made of sheet metal.

3. The air bag system according to claim 1,
   wherein the fastening stem portion is passed through the attaching hole and the through hole in the attaching piece portion so as to be fastened to the circumferential edge of an attaching bole formed in a body side of the inner panel which makes up the recess portion, and
   wherein the head portion which presses the circumferential edge of the attaching hole in the attaching bracket against the inner panel side to thereby fix the attaching bracket to the inner panel when the fastening stem portion is fastened to the inner panel.

4. The air bag system according to claim 1, wherein the attaching bracket is provided in such a manner that at least one of the strengthening plates is interposed between the head portion and the inner panel.

5. The air bag system according to claim 4, wherein a circumferential edge of an attaching hole in one strengthening plate, which covers an inside of the attaching piece portion, is substantially flush with an external surface of the other strengthening plate, which covers an external side of the attaching piece portion.

6. The air bag system according to claim 1, wherein the attaching bracket is provided in such a manner that both the strengthening plates are interposed between the bead portion and the inner panel.

7. The air bag system according to claim 6, wherein one strengthening plate, which covers an inside of the attaching piece portion, has an attaching hole, the inside diameter of which is substantially identical to that of an attaching hole in the other strengthening plate, which covers an external side of the attaching piece portion.

8. The air bag system according to claim 1, wherein the attaching piece portion is configured so as to include a projecting portion which prevents the dislodgement of the attaching piece portion from the attaching bracket at a distal end side thereof which is away from the air bag main body and is exposed from the attaching bracket.

* * * * *